May 25, 1954  A. R. SMITH ET AL  2,679,375
AUTOMATIC WEIGHING MACHINE WITH EPICYCLIC CONTROL
Filed Nov. 16, 1950  3 Sheets-Sheet 1

Inventors
A. R. Smith
G. A. Lee
C. J. Hopkins

May 25, 1954  A. R. SMITH ET AL  2,679,375
AUTOMATIC WEIGHING MACHINE WITH EPICYCLIC CONTROL
Filed Nov. 16, 1950  3 Sheets-Sheet 3

Inventors
A.R.Smith
G.A.Lee
C.J.Hopkins

Patented May 25, 1954

2,679,375

UNITED STATES PATENT OFFICE 2,679,375

AUTOMATIC WEIGHING MACHINE WITH EPICYCLIC CONTROL

Arthur Ronald Smith, Birmingham, and George Arthur Lee and Cyril John Hopkins, Cuffley, England Application November 16, 1950, Serial No. 195,969

Claims priority, application Great Britain November 29, 1949

9 Claims. (Cl. 249—53)

This invention relates to automatic weighing machines of the kind in which powdered, granular, or like material is supplied under the control of a slidable shutter from a hopper to a weigh pan on a weigh beam, and is discharged from the weigh pan under the control of closure means at the lower end of the pan.

The primary object of the invention is to enable the slidable shutter and the pan-closure means to be actuated under the control of the weigh beam in a simple and effective manner which ensures a high degree of accuracy in the weighing operations.

The invention comprises an automatic weighing machine of the kind specified, having in combination rotary cam means for actuating the slidable shutter and the pan-closure means, and epicyclic mechanism for imparting intermittent rotary movements to the cam means under the control of the weigh beam.

In the accompanying sheets of explanatory drawings.

Figure 1:
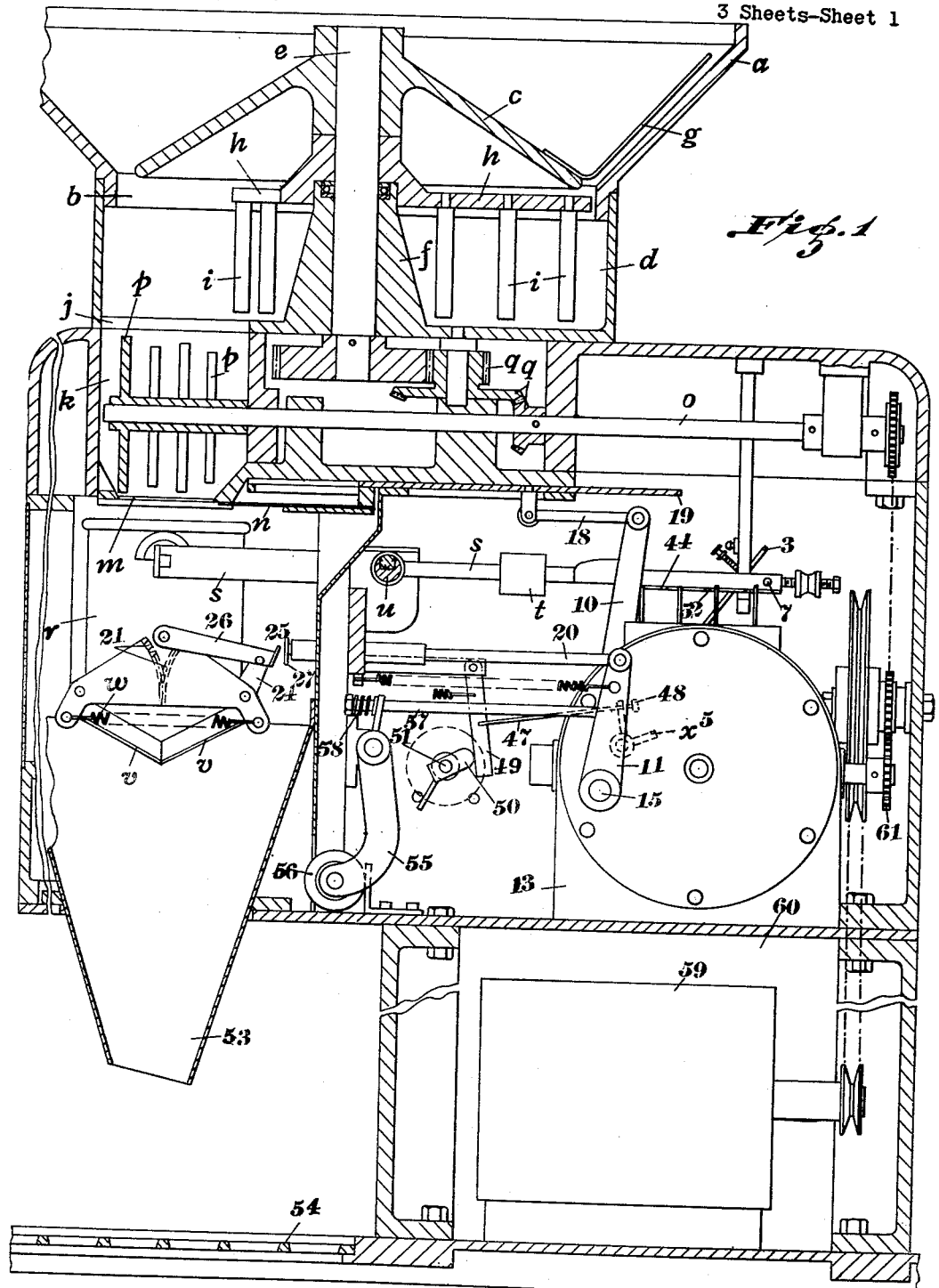
Figure 1 is a part sectional front view of an automatic weighing machine embodying the invention.

In carrying the invention into effect as shown, we employ, for the material to be weighed, a supply hopper $a$ provided at its lower end with a relatively large delivery opening $b$, and in this end of the hopper is arranged a disc $c$ of shallow conical form, the diameter of the disc being sufficiently smaller than that of the delivery opening to leave a narrow annular gap through which material can flow from the hopper into a receiving chamber $d$ beneath the hopper. The disc $c$ is secured on the upper end of a vertically arranged rotary shaft $e$ which extends through and is supported by a bearing $f$ in the receiving chamber $d$. The purpose of the disc $c$ is to support the bulk of the material within the hopper $a$, and thereby prevent this material from exerting undesirable pressure on the material in the receiving chamber $d$. If desired an arm or arms as $g$ may be secured to the upper side of the disc $c$ for agitating the material in the hopper $a$. Mounted on the rotary shaft $e$ at the underside of the disc $c$ are a plurality of radial arms $h$, and depending from each of these arms are vertical fingers $i$ which serve to create in the material within the receiving chamber $d$ a continuous state of agitation during rotation of the shaft.

Beneath an opening $j$ in one side of the base of the receiving chamber $d$ is arranged a discharge chamber $k$ into which material from the receiving chamber can flow, and which is provided at its lower end with a discharge opening $m$ controlled by a slidable shutter $n$. Extending transversely across the discharge chamber $k$ is an end portion of a horizontal rotary spindle $o$, and on this spindle portion are mounted radial fingers $p$ which serve to agitate the material in the discharge chamber. The horizontal spindle $o$ is adapted at the end remote from the fingers $p$ to receive motion from any convenient source, and is also adapted to impart motion through suitable gearing $q$ to the vertical shaft $e$ above mentioned.

Located beneath the discharge opening $m$ of the discharge chamber $k$ is a weigh pan $r$ for receiving the material discharged from this chamber under the control of the slidable shutter $n$. The weigh pan $r$ is mounted in the usual manner on one arm of a double-armed weigh beam $s$ having a weight or weights $t$ adjustably mounted on its other arm, and having a transverse fulcrum bar or bars $u$ at the junction of its arms. At its lower end the weigh pan $r$ is provided with a pair of flaps $v$ which normally serve under the action of an interconnecting spring $w$ to close the lower end of the pan, but which are movable against the action of the spring for enabling the contents of the pan to be discharged after each weighing operation.

For enabling the weigh beam $s$ to commence its movement under the weight of the material in the weigh pan $r$ before the full amount of material has been supplied to the pan, any convenient counterpoise is employed. In the example shown, this comprises a rotatably supported horizontal spindle 2 to which is secured a depending radial arm 3 having its lower end connected to the upper end of a tension spring 4, the tension of this spring being adjustable by any convenient screw or other manually operable means 5 connected to the lower end of the spring. Also secured to the spindle 2 is another radial arm 6 which is adapted, under the action of the tension spring 4 above mentioned, to exert a lifting effort on the weigh beam $s$ at the side of its fulcrum remote from the weigh pan $r$. When the weigh beam occupies its normal rest position, as shown, the tension spring 4 and the arm 3 to which it is connected occupy positions oppositely inclined to the vertical. In this condition the other arm 6 serves, by acting on a projection 7 extending laterally from the adjacent part of the weigh beam $s$, to exert a maximum lifting effort on the weigh beam. This effort is, however, insufficient by itself to move the beam s, and serves merely to assist the material received by the weigh pan r to move the beam before the full amount of material has been supplied to the pan. Moreover, the arrangement is such that as the movement of the beam s progresses, the tension spring 4 and associated arm 3 gradually approach vertical positions in alignment with each other, with the result that the lifting effort exerted on the beam by the other arm 6 is correspondingly diminished. When the tension spring 4 and the associated arm 3 reach vertical positions, the other arm 6 ceases to exert a lifting effort on the weigh beam s, and the latter completes its weighing movement solely under the weight of the material received by the weigh pan r.

For actuating the slidable shutter n at the lower end of the discharge chamber k, and the closure flaps v at the lower end of the weigh pan r, we employ a pair of rotary cams 8, 9 and a pair of spring loaded levers 10, 11 operable by the cams. The cams 8, 9 are rotatably mounted on a fixed horizontal shaft 12 in a gear box 13, and the levers 10, 11 are secured on the outer ends of short rotary shafts 14, 15 which extend through opposite sides of the gear box, and which at their inner ends carry followers 16, 17 for co-operating with the peripheries of the corresponding cams. The outer end of the lever 10 is connected by a link 18 and a slide 19 to the slidable shutter n, and the outer end of the other lever 11 is connected to a slidable rod 20 for acting on the pan-closure flaps v.

For enabling the pan-closure flaps v to be opened simultaneously under the action of the slidable rod 20, a pair of interengaging toothed segments 23 are respectively secured to the closure flaps, and one of these segments is provided with an arm 24 on which is mounted a laterally projecting peg 25. A latch bar 26 having an oblique end is pivoted at its other end to the pan r and engages the peg 25 to retain the flaps v in their closed positions when the pan is being supplied with the material to be weighed. At the end adjacent to the weigh pan r the slidable rod 20 is provided with a laterally extending arm 27. When this rod 20 is moved in one direction under the action of the corresponding cam 9, the arm 27 on the rod first acts on the oblique end of the latch bar 26 to disengage the latter from the peg 25 on the segment arm 24, and subsequently acts on the peg to open the closure flaps v. Movement of the slidable bar 20 in the opposite direction permits the flaps v to close under the action of their interconnecting spring w, and the latch bar 26 to re-engage the peg 25.

Figure 2:
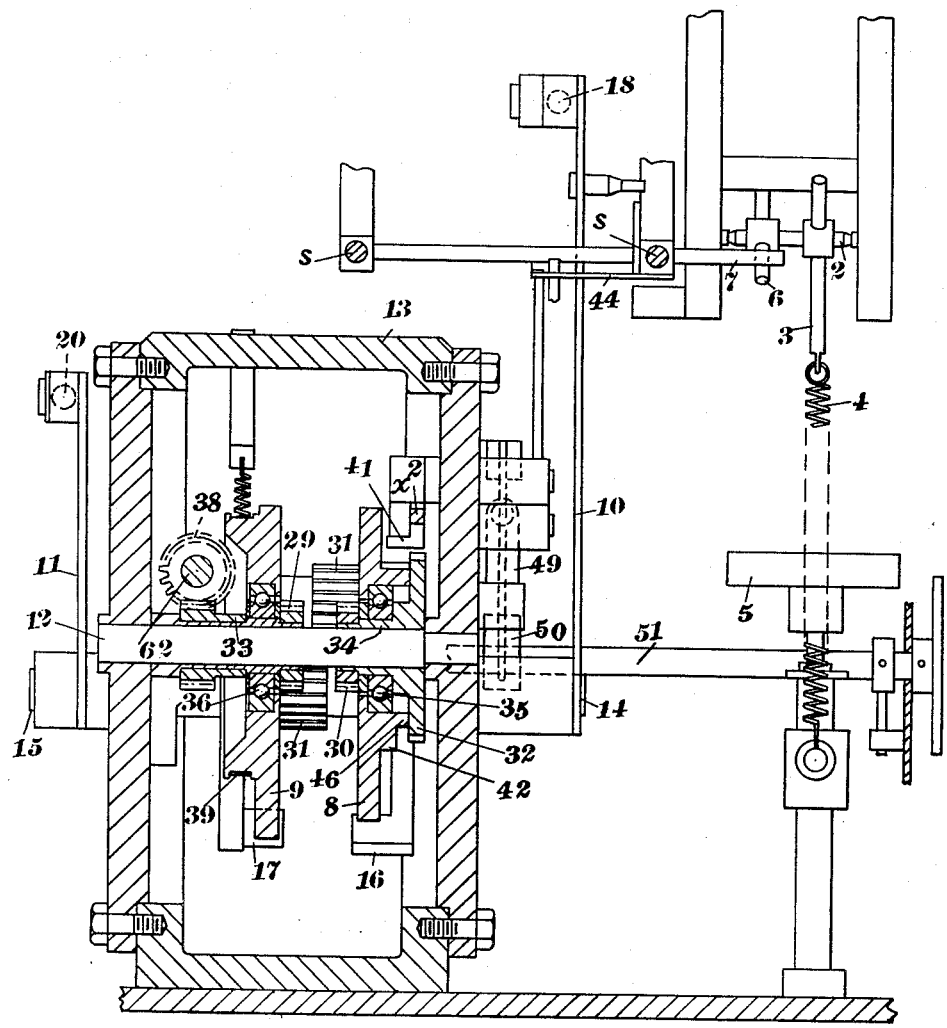
Figures 2 and 3 are respectively a sectional side view and a sectional front view illustrating the epicyclic mechanism and associated parts to a larger scale than Figure 1.
Figure 3:
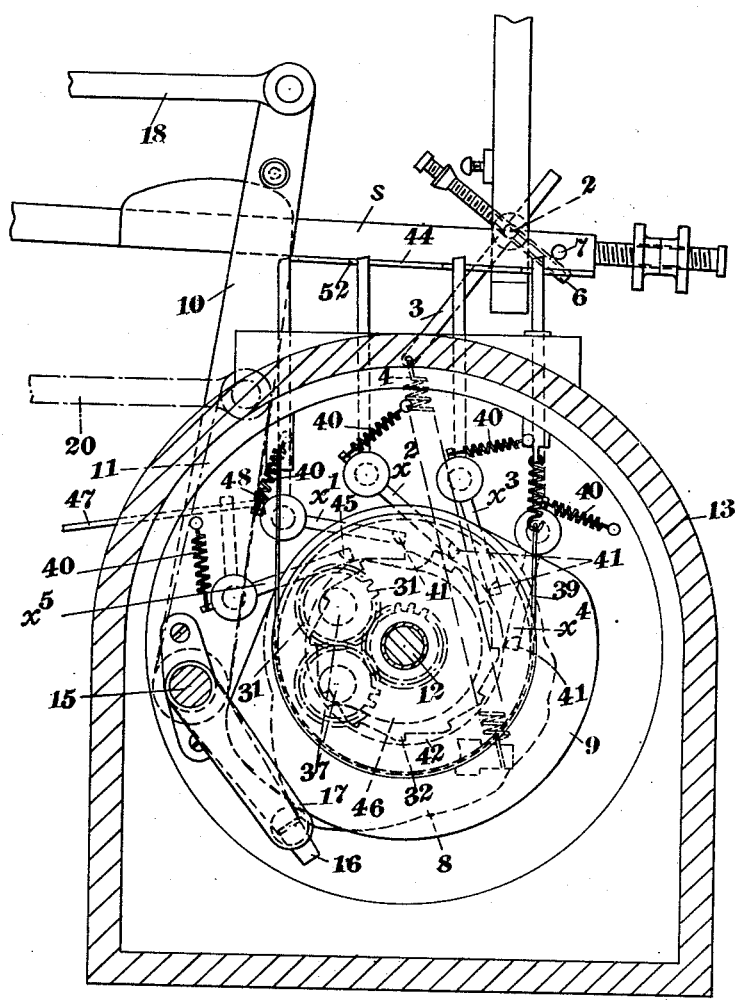

For co-ordinating the movements of the slidable shutter n and the pan-closure flaps v with the movements of the weigh beam s, we mount in the gear box 13 an epicyclic mechanism adapted to impart intermittent motion to the cams 8, 9 under the control of the weigh beam. This epicyclic mechanism is shown in Figures 2 and 3 and comprises a driving sun pinion 29, a driven sun pinion 30, a pair of interengaging planet pinions 31 respectively engaging the sun pinions, and a ratchet wheel 32 secured to the driven sun pinion. The sun pinions 29, 30 are formed on or secured to sleeves 33, 34 which are rotatably mounted in axially spaced relationship on the fixed horizontal shaft 12 in the gear box, and on which the cams 9, 8 are rotatably supported by ball or roller bearings 35, 36, the cams being rigidly connected together by rods 37 arranged parallel with the shaft. The interengaging planet pinions 31 are arranged between, and rotatably supported by the rods 37 interconnecting the cams 8, 9. The ratchet wheel 32 is formed on or secured to the sleeve 34 of the driven sun pinion 30. The sleeve 33 of the driving sun pinion 29 is adapted to receive continuous rotary motion from an electric motor or other source through worm or other gearing 38. Further the cam 9 supported by the sleeve 33 is constantly subjected to a light braking action by a spring loaded brake band 39 carried by the gear box 13.

When the ratchet wheel 32 is free, it is rotated by the driving sun pinion 29, and no motion is imparted to the cams 8, 9, but when the ratchet wheel is arrested the driving sun pinion serves to impart action to the cams.

For intermittently arresting and releasing the ratchet wheel 32 we employ a plurality of spring loaded pawls which are pivotally mounted in spaced relationship on the inner side of the gear box 13 adjacent to the ratchet wheel, and which are adapted at their inner ends to engage the ratchet wheel. In the example shown, five such pawls are employed, and are indicated respectively by $x^1$, $x^2$, $x^3$, $x^4$ and $x^5$, the loading springs of these pawls being all indicated by 40.

At their inner ends four of the pawls, namely $x^1$, $x^2$, $x^3$ and $x^4$, are provided with lateral projections 41 or are otherwise adapted to co-operate with a third cam or cam track 42 formed on or secured to the outer side of the cam 9 associated with the driven sun pinion 30, and the outer ends of these pawls are adapted to co-operate with a notched plate 44 secured to the end of the weigh beam s remote from the weigh pan r. These four pawls $x^1$ to $x^4$ are situated at different distances from the fulcrum of the weigh beam s, and are herein termed the first, second, third, and fourth pawl respectively in the sequence in which their distances from the weigh beam fulcrum increase.

The inner end of the other pawl $x^5$, herein termed the fifth pawl, is also provided with a lateral projection 45 or is otherwise adapted to co-operate with a fourth cam or cam track 46 situated at the outer side of the third cam or cam track 42 and likewise formed on or secured to the cam 8 associated with the driven sun pinion 30. The outer end of the fifth pawl $x^5$ is connected to any convenient manually controlled means whereby this pawl can be held out of action if desired. Thus, in the example shown, a rod 47 extends at one end through a hole in the outer end of the fifth pawl $x^5$, and on this end of the rod is provided a head 48 by which the fifth pawl can be held out of action in response to axial movement of the rod in one direction (to the left in Figure 1). The other end of the rod 47 is connected to a spring loaded lever 49 by which the rod is movable in the above mentioned direction under the control of an abutment 50 on a manually rotatable spindle 51.

It will be assumed that the machine is in operation and that the weigh beam s is commencing to move under the weight of the material in the weigh pan r. In this condition the fifth pawl is held by the fourth cam or cam track 46 out of engagement with the ratchet wheel 32. Also the second, third and fourth pawls $x^2$, $x^3$ and $x^4$, are held by the third cam or cam track 42 out of engagement with the ratchet wheel 32. Moreover, although the first pawl $x^1$ has been released by the third cam or cam track 42, this pawl is also held out of engagement with the ratchet wheel 32 by contact with one end of the notched plate 44 on the weigh beam $s$. As the ratchet wheel 32 is now free, it is rotated through the interengaging sun and planet pinions, 29—31, and no motion is imparted to the cams 8, 9, the latter being held against accidental movement by the brake band 39 above mentioned. The first effect of the movement of the weigh beam is to release the first pawl $x^1$ which thereupon engages and arrests the ratchet wheel 32. The interaction of the sun and planet pinions 29—31 now causes rotary motion of the cams 8, 9 until the first pawl $x^1$ is moved by the third cam or cam track 42 out of engagement with the ratchet wheel 32. At the same time the second pawl $x^2$ is released by the third cam or cam track 42, but is prevented from engaging the ratchet wheel 32 by contact with one side of a notch 52 in the notched plate 44 on the weigh beam $s$. Upon the first pawl $x^1$ being moved out of engagement with the ratchet wheel 32, therefore, the latter is rotated and the cams 8, 9 are brought to rest by the brake band 39. The continued movement of the weigh beam $s$ causes the second, third and fourth pawls $x^2$, $x^3$ and $x^4$, in sequence to be brought into and put out of action in the same way as the first pawl $x^1$.

The above described sequential operation of the first, second, third and fourth pawls $x^1$ to $x^4$ causes intermittent angular movements to be imparted to the cams 8, 9 which in turn impart intermittent sliding movement to the shutter $n$ in the direction for closing the discharge opening $m$, and to the slidable rod 20 in the direction for opening the pan-closure flaps $v$.

The fourth pawl $x^4$ is put out of action following closure of the shutter $n$ and opening of the flaps $v$. When this movement of the fourth pawl $x^4$ cam is effected, the fifth pawl $x^5$ (if in use) is released by the fourth cam or cam track 46 and serves by engagement with the ratchet wheel 32 to cause rotary movement of the cams 8, 9 to their initial positions where the fifth pawl is put out of action by the fourth cam or cam track preparatory to the above described sequence of operations being repeated. It will be understood that this movement of the cams 8, 9 to their initial positions is accompanied by sequential closing of the pan flaps $v$ and opening of the shutter $n$. If, however, the fifth pawl $x^5$ is held out of action as previously described, the cams 8, 9 are not re-set following closure of the shutter $n$ and opening of the flaps $v$, with the result that the sequence of operations cannot be repeated until the fifth pawl is again brought into use by appropriate manipulation of the manually rotatable spindle 51.

The sequential contact of the first, second, third and fourth pawls $x^1$ to $x^4$ with the notched plate 44 on the weigh beam $s$ serves to minimise or counteract momentum of the weigh beam and weigh pan $r$.

Each weighed quantity of material discharged from the weigh pan $r$ flows through a vertically arranged funnel 53 of inverted conical form for directing the material into a receptacle placed on a base piece 54 beneath the funnel. Preferably this base piece 54 is perforated so that, if a receptacle to be charged is not in position on the base piece, material from the funnel 53 can flow through the perforations in the base piece into a chamber (not shown) beneath the base piece.

To dislodge any material adhering to the interior of the funnel 53, one side of the funnel may be subject to the impact of a striker after each weighed quantity of material has been discharged. In one convenient form this striker may comprise a lever 55 pivoted at one end on a fixed support, and carrying at the other end a rubber-covered roller 56, the lever being operable to bring the roller into sharp contact with the adjacent side of the funnel 53 by a rod 57 attached to the cam-operable lever 11 for actuating the pan-closure flaps $v$, this rod having mounted thereon a spring 58 through which the rod can actuate the striker lever during the return movement of the cam-operable lever after it has been actuated to open the pan-closure flaps.

In the example shown an electric motor 59 is mounted in a chamber 60 beneath the gear box 13, and this motor is used for imparting motion through any convenient gearing 61 to the spindle $o$, and also to an actuating spindle 62 associated with the worm gearing 38.

By this invention we are able to actuate the slidable shutter and the pan-closure flaps solely by mechanical means, and at the same time ensure high degrees of accuracy and rapidity in the weighing operations.

The invention is not, however, limited to the example described as subordinate details may be varied to suit different requirements.

Having thus described our invention what we claim as new and desire to secure by Letters Patent is:

1. An automatic weighing machine having in combination a weigh beam, a weigh pan carried by one end of the weigh beam and provided at its lower end with closure means for controlling discharge of weighed material from the pan, a supply hopper situated above the weigh pan, a slidable shutter for controlling the supply of material to be weighed from the hopper to the weigh pan, rotary cam means for actuating the slidable shutter and the pan-closure means, epicyclic mechanism for imparting intermittent rotary movements to the cam means, and means responsive to movement of the weigh beam for controlling the epicyclic mechanism.

2. An automatic weighing machine having in combination a weigh beam, a weigh pan carried by one end of the weigh beam and provided at its lower end with closure means for controlling discharge of weighed material from the pan, a supply hopper situated above the weigh pan, a slidable shutter for controlling the supply of material to be weighed from the hopper to the weigh pan, rotary cam means for actuating the slidable shutter and the pan-closure means, epicyclic mechanism for imparting intermittent rotary movements to the cam means, the epicyclic mechanism comprising a driving sun pinion, a driven sun pinion, a shaft on which the sun pinions and the cam means are rotatably supported, and a pair of interengaging planet pinions rotatably supported by the cam means and respectively engaging the sun pinions, and means responsive to movement of the weigh beam for intermittently arresting and releasing the driven sun pinion.

3. An automatic weighing machine having in combination a weigh beam, a weigh pan carried by one end of the weigh beam and provided at its lower end with closure means for controlling discharge of weighed material from the pan, a supply hopper situated above the weigh pan, a slidable shutter for controlling the supply of material to be weighed from the hopper to the weigh pan, rotary cam means for actuating the slidable shutter and the pan-closure means, epicyclic mechanism for imparting intermittent rotary movements to the cam means, the epicyclic mechanism comprising a driving sun pinion, a driven sun pinion, a shaft on which the sun pinions and the cam means are rotatably supported, and a pair of interengaging planet pinions rotatably supported by the cam means and respectively engaging the sun pinions, a ratchet wheel secured to the driven sun pinion, and a plurality of spring loaded pawls for intermittently engaging and releasing the ratchet wheel under the control of the weigh beam and cam means.

4. An automatic weighing machine as claimed in claim 3, and having a constantly acting brake for arresting the cam means when the ratchet wheel is released.

5. An automatic weighing machine as claimed in claim 3, and having in combination with the weigh beam, pawl-controlling means for holding the pawls out of engagement with the ratchet wheel at the commencement of a weighing operation, and thereafter successively releasing the pawls to enable them to engage the ratchet wheel in turn during the weighing operation.

6. An automatic weighing machine as claimed in claim 3, and having on the end of the weigh beam remote from the weigh pan a notched plate for holding the pawls out of engagement with the ratchment wheel at the commencement of a weighing operation, and thereafter successively releasing the pawls to enable them to engage the ratchet wheel in turn during the weighing operation.

7. An automatic weighing machine as claimed in claim 3, in which the cam means comprise a cam for actuating the slidable shutter, a second cam for actuating the pan-closure means, and a third cam on the first mentioned cam for releasing the pawls from the ratchet wheel.

8. An automatic weighing machine as claimed in claim 3, in which an additional spring-loaded pawl is provided for engaging and arresting the ratchet wheel, and in which the cam means comprise a cam for actuating the slidable shutter, a second cam for actuating the pan-closure means, a third cam on the first mentioned cam for releasing the first mentioned pawls from the ratchet wheel, and a fourth cam on the shutter-actuating cam for controlling the additional pawl.

9. An automatic weighing machine as claimed in claim 3, in which an additional spring-loaded pawl is provided for engaging and arresting the ratchet wheel, and in which the cam means comprise a cam for actuating the slidable shutter, a second cam for actuating the pan-closure means, a third cam on the first mentioned cam for releasing the first mentioned pawls from the ratchet wheel, and a fourth cam on the shutter-actuating cam for controlling the additional pawl, manually controllable means being provided for putting the additional pawl out of action.

References Cited in the file of this patent

UNITED STATES PATENTS

| Number | Name | Date |
| --- | --- | --- |
| 1,233,912 | Chase | Mar. 4, 1921 |
| 1,558,668 | Carter | Oct. 27, 1925 |
| 1,664,661 | Chase | Apr. 3, 1928 |
| 1,724,711 | Hollick | Aug. 13, 1929 |
| 1,953,646 | Currier | Apr. 3, 1934 |
| 2,058,775 | Cundall | Oct. 27, 1936 |
| 2,100,874 | Ryan | Nov. 30, 1937 |
| 2,137,334 | Dorrington | Nov. 22, 1938 |
| 2,183,026 | Mason | Dec. 12, 1939 |
| 2,207,885 | Howard | July 16, 1940 |

FOREIGN PATENTS

| Number | Country | Date |
| --- | --- | --- |
| 434,394 | Great Britain | 1935 |